US011901090B1

(12) United States Patent
Shivprasad et al.

(10) Patent No.: US 11,901,090 B1
(45) Date of Patent: Feb. 13, 2024

(54) HYDROGEN INFUSED NUCLEAR REACTOR CORE MONOLITHS

(71) Applicant: Triad National Security, LLC, Los Alamos, NM (US)

(72) Inventors: Aditya Shivprasad, Los Alamos, NM (US); Stuart Andrew Maloy, Albuquerque, NM (US); Erik Luther, Los Alamos, NM (US); Tarik Saleh, Los Alamos, NM (US)

(73) Assignee: TRIAD NATIONAL SECURITY, LLC, Los Alamos, NM (US)

( * ) Notice: Subject to any disclaimer, the term of this patent is extended or adjusted under 35 U.S.C. 154(b) by 0 days.

(21) Appl. No.: 17/492,025

(22) Filed: Oct. 1, 2021

Related U.S. Application Data

(60) Provisional application No. 63/086,704, filed on Oct. 2, 2020.

(51) Int. Cl.
*G21C 5/12* (2006.01)

(52) U.S. Cl.
CPC .................................... *G21C 5/12* (2013.01)

(58) Field of Classification Search
CPC ........................................................ G21C 5/12
USPC ........................................................ 376/350
See application file for complete search history.

(56) References Cited

U.S. PATENT DOCUMENTS 3,018,169 A * 1/1962 Vetrano .................... G21C 5/12 376/904
3,150,052 A * 9/1964 Stoker .................... G21C 13/04 376/350
3,607,631 A * 9/1971 Hobson .................... G21D 7/04 376/321

OTHER PUBLICATIONS

Polunin, "Fabrication processes and testing of the moderator for irradiating devices of BN reactors. Testing of the moderator", In IOP Conference Series: Materials Science and Engineering, vol. 1005, No. 1, p. 012001. IOP Publishing, 2020. (Year: 2020).*

(Continued)

*Primary Examiner* — Jack W Keith
*Assistant Examiner* — Daniel Wasil
(74) *Attorney, Agent, or Firm* — Alston & Bird LLP

(57) ABSTRACT

Hydrogen infused nuclear reactor core monoliths and processes for their production are disclosed. Such monoliths may function as both a core monolith and a moderator, providing structure and at least some moderation. Hydrogen infused monoliths may be complementary to or be used in lieu of separate moderators for thermalizing neutrons.

10 Claims, 4 Drawing Sheets

(56) References Cited

OTHER PUBLICATIONS

Northwood, "Hydrides and delayed hydrogen cracking in zirconium and its alloys." International metals reviews 28, No. 1 (1983): 92-121. (Year: 1983).*

Hu, "Fabrication of zirconium hydride with controlled hydrogen loading", No. ORNL/SPR-2020/1672. Oak Ridge National Lab. (ORNL), Oak Ridge, TN (United States), Oct. 1, 2020. (Year: 2020).*

Thornton, "Comprehensive Technical Report, General Electric Direct-Air-Cycle Aircraft Nuclear Propulsion Program, Program Summary and References", No. APEX-901. Office of Scientific and Technical Information (OSTI), Oak Ridge, TN (United States), 1962. (Year: 1962).*

Lao, "Core physics calculation study of miniature lead-bismuth cooled nuclear reactor", In IOP Conference Series: Earth and Environmental Science, vol. 354, No. 1, p. 012028. IOP Publishing, 2019. (Year: 2019).*

U.S. Department of Energy "What is a Nuclear Microreactor?" Page available at https://www.energy.gov/ne/articles/what-nuclear-microreactor (Feb. 26, 2021).

* cited by examiner

HYDROGEN INFUSED NUCLEAR REACTOR CORE MONOLITHS

CROSS-REFERENCE TO RELATED APPLICATION

This application claims the benefit of U.S. Provisional Patent Application No. 63/086,704 filed Oct. 2, 2020. The subject matter of this earlier filed application is hereby incorporated by reference in its entirety.

STATEMENT OF FEDERAL RIGHTS

The United States government has rights in this invention pursuant to Contract No. 89233218CNA000001 between the United States Department of Energy and Triad National Security, LLC for the operation of Los Alamos National Laboratory.

FIELD

The present invention generally relates to nuclear reactors, and more specifically, to hydrogen infused nuclear reactor core monoliths and processes for the production thereof.

BACKGROUND

Metal hydrides may be used as moderator material to thermalize neutrons and improve fuel utilization. Thus, the use of moderators decreases the overall cost of the reactor and reduces the amount of fuel required to achieve criticality. A significant challenge with many moderator materials is their brittle nature and hydrogen off-gassing, while a challenge with core monolith materials, especially graphite and ceramics, is their thermal expansion mismatch with other core materials, such as heat pipes and fuel cladding. Accordingly, an improved design and process that at least partially alleviates these challenges may be beneficial.

SUMMARY

Certain embodiments of the present invention may provide solutions to the problems and needs in the art that have not yet been fully identified, appreciated, or solved by conventional nuclear reactor technologies. For example, some embodiments of the present invention pertain to hydrogen infused nuclear reactor core monoliths and processes for the production thereof.

In an embodiment, a nuclear reactor core includes a monolith including a hydrogen infused metallic material.

In another embodiment, a nuclear reactor core monolith includes a hydrogen infused material that has an atomic percent of hydrogen that is at or below a solubility limit of hydrogen for the material.

In yet another embodiment, a nuclear microreactor core monolith includes a hydrogen infused metallic material has an atomic percent of hydrogen that is at or below a solubility limit of hydrogen for the metallic material. The hydrogen infused metallic material is supersaturated with hydrogen, with respect to a first phase, and frozen at least partially in a second phase at 68-72° F.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

Unless otherwise indicated, similar reference characters denote corresponding features consistently throughout the attached drawings.

DETAILED DESCRIPTION OF THE EMBODIMENTS

Figure 1:
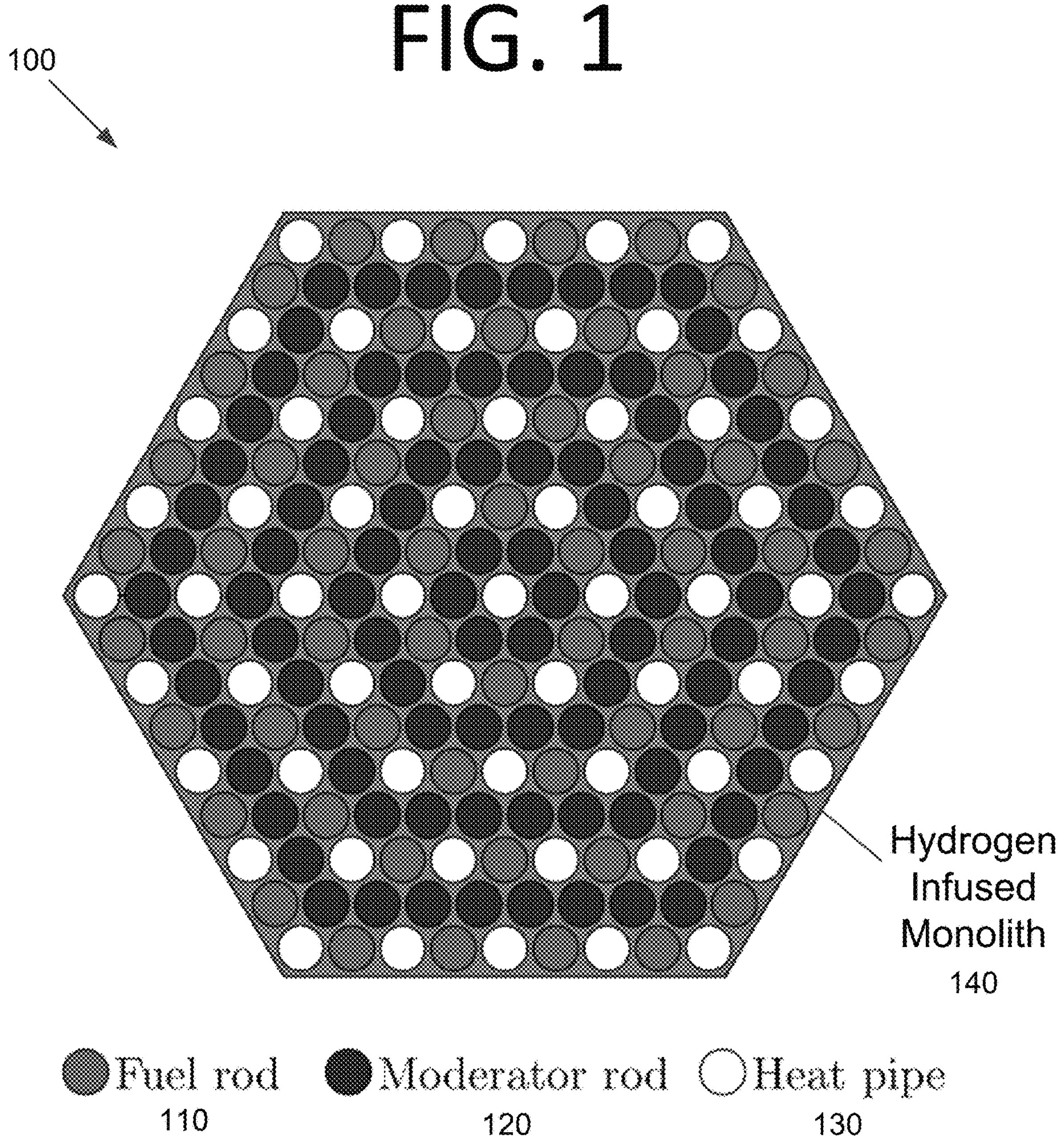
FIG. 1 is a top cutaway view illustrating a nuclear reactor core, according to an embodiment of the present invention.

Some embodiments of the present invention pertain to hydrogen infused nuclear reactor core monoliths and processes for the production thereof. As such, the core monoliths of some embodiments may function as both a core monolith and a moderator. However, separate moderators may also be included in the reactor core without deviating from the scope of the invention. Whether separate moderators are desired or needed may depend on the given reactor design.

While some embodiments may be employed in nuclear reactors of any type, certain embodiments are specifically designed for microreactors. Microreactors are not defined by their fuel form or coolant. Instead, they are relatively small designs that produce up to 20 megawatts of thermal energy that may be used directly as heat and/or be used to generate electric power. Microreactors typically have the following three main features.

Factory fabricated: All components of a microreactor are typically fully assembled in a factory and shipped out to the location where the microreactor will be deployed. This eliminates difficulties associated with large-scale construction, reduces capital costs, and facilitates getting the microreactor up and running more quickly than other reactor types.

Transportable: Smaller unit designs tend to make microreactors readily transportable. For instance, vendors may ship the entire microreactor by truck, ship, aircraft, or train.

Self-adjusting: Relatively straightforward and responsive design concepts may allow microreactors to self-adjust. Such microreactors typically do not require a large number of specialized operators and may utilize passive safety systems that prevent potential overheating or reactor meltdown.

Previous nuclear reactor designs have separate, distinct moderators for thermalizing neutrons. The core monolith is used to hold the reactor core components together rather than for this purpose. Indeed, in some previous designs, the core monolith is detrimental to or non-contributory for thermalizing neutrons.

As temperature in the reactor increases, hydrogen content should decrease, which should also cause moderation to decrease. However, by infusing the monolith with hydrogen, the hydrogen may be maintained in the monolith solid without coming off, as may happen in distinct hydride moderators. As used herein, "hydrogen infused" means that the hydrogen content is at or below the saturation (i.e., solubility) limit of the material, or supersaturated hydrogen is trapped in the material. While the hydrogen concentration of the monolith in some embodiments may be lower than in hydride moderators, the overall mass of the hydrogen may be comparable.

In some embodiments, hydrogen infused zirconium-based alloys are used as the core monolith material. These alloys may include, but are not limited to, Zr-2.5Nb, alloys of Zr with Sn, Fe, Cr, and/or Ni, or any other commercially available or after arising zirconium alloys with a low Hf content without deviating from the scope of the invention. To produce a hydrogen infused monolith, the zirconium-based alloy may be exposed to hydrogen such that the hydrogen concentration within the monolith is below the solid solubility of hydrogen in zirconium (i.e., at or below approximately 10 atomic percent). Above this atomic percent of hydrogen in alpha phase zirconium, the hydride phase starts forming. The use of hydrogen infused zirconium or other hydrogen infused materials within the core monolith may reduce the need for distinct moderator materials within the reactor such that the hydrogen infused zirconium-based alloy functions as both the core monolith and the moderator. Additionally, the use of a low hydrogen content may preclude hydrogen off-gassing of the moderator due to the low partial pressures of hydrogen required to keep hydrogen in solution (e.g., 0.3% of an atmosphere of $H_2$ at 875° C.).

Zirconium is nearly transparent to neutrons, and due to its ubiquity in the industry, large amounts of zirconium can be readily produced and obtained. Neutron transparency is measured in terms of the neutron capture cross-section, which is essentially a probability of neutrons being captured by that isotope. The lower the capture cross-section, the more transparent the isotope/element is to neutrons. Cross-sections are measured in barns (b). For example, yttrium has a neutron absorption cross-section of 1.28 b, natural zirconium has a neutron absorption cross-section of 0.19 b, cerium has a neutron absorption cross-section of 0.63 b, and thorium has a neutron absorption cross-section of 7.34 b. Other elements, alloys, or combinations thereof with or without zirconium that are highly neutron transparent may be used without deviating from the scope of the invention. This is contrasted with the iron in stainless steel and chromium, for example, which absorbs a significant amount of the neutrons.

The monolith may be manufactured as one single piece or manufactured in multiple pieces and infused with hydrogen. These pieces may then subsequently be joined by welding, for example. While welding may affect the properties of the structure, it is suspected that welding will work since there probably will not be much expansion at 10 atomic percent hydrogen or less, for example. Size and geometry may dictate the number, shape, and size of pieces that are used. For example, it may be easier to manufacture a smaller monolith for a small reactor as a single piece, but production processes may lend to creating the monolith for a larger reactor in multiple pieces. However, adding hydrogen at a high enough temperature should homogenously introduce hydrogen throughout the monolith material.

In some embodiments, the shape of the monolith may be substantially similar to previous monolith designs. However, unlike previous monoliths, the monolith of some embodiments is infused with hydrogen at 10 atomic percent hydrogen or less, for example. In certain embodiments, various monolith shapes may be used including by not limited to, spheres, cylinders, hexagons, irregular shapes, etc. However, the shape may depend on the given reactor design, and any suitable shape may be used without deviating from the scope of the invention.

The amount of time for hydrogen absorption may vary based on size. For instance, 10 atomic percent hydrogen may be achieved quickly for small samples, but may be longer for larger samples. Hydrogen absorption rates for zirconium at high temperatures are quite fast. The time for the desired amount of hydrogen to be absorbed may vary with the geometry of the monolith or piece thereof, the geometry of the reaction vessel, the gas flow rate, the gas composition, etc.

Some embodiments can bridge the gap between a fully moderated, partially moderated, and unmoderated reactor. The hydrogen infused core monoliths of some embodiments provide partial moderation for the reactor. Based on the design, extra moderation could be provided by adding distinct moderator components (e.g., moderator rods). The hydrogen infused monolith provides better moderation than stainless steel or other metals that may be used for nuclear reactor monoliths.

There is a wide range of different reactor types in some embodiments. For instance, a smaller and more compact reactor may be built that doesn't require separate moderators and functions well using the hydrogen infused monolith alone. This may provide some weight reduction, as well as a substantial volume reduction. Also, getting the fuel close to the moderating element (e.g., the hydrogen infused monolith) and close to itself is important for promoting neutronic activity and reducing leakage. This is readily possible when fuel rods are placed directly into the hydrogen infused moderating monolith, for example. Reduction of complexity provides yet another advantage.

Some embodiments make the hydrogen infused element (e.g., zirconium) dual use (i.e., providing structure (typically not load bearing) and at least some moderation), and also removes some of the problems with full hydride core blocks. For instance, fully hydride core blocks are more brittle, and maintaining the desired stoichiometry may be relatively difficult. The process of some embodiments is unique, and has benefits for structural and fabrication purposes. For instance, zirconium with hydrogen content at or below the saturation limit would be more ductile than a fully hydrided core monolith.

The hydrogen infusion process of some embodiments produces a structural monolith element(s) and/or alloy(s) that has a relatively low amount of absorbed hydrogen (e.g., 10 atomic percent or less). Per the above, the monolith element(s) and/or alloy(s) may include, but are not limited to, zirconium, aluminum, cerium, scandium, beryllium alloys, magnesium, graphite, beryllium oxide, zirconium hydride, yttrium dihydride, etc. The atomic percent will depend on the specific material(s) that are used. For instance, if a given material has a hydrogen saturation limit of 7 atomic percent, absorbed hydrogen will be at 7 atomic percent or less.

In some embodiments, the hydrogen infusion process may trap supersaturated hydrogen within the monolith. The hydrogen and other structural element(s) exist in two phases at room temperature, and hydrides are a small volume fraction at room temperature. For instance, if a zirconium monolith is below 10 atomic percent hydrogen and in the alpha phase (also referred to as a "first phase" herein), then at room temperature, the phase fraction of zirconium dihydride will be approximately 16% by volume. However, as reactor temperatures are raised to operating temperatures, the hydrogen goes into solution.

With zirconium, the hydrogen stabilizes the beta (high temperature) phase (also called a "second phase" herein) of the zirconium, so a relatively large amount of hydrogen can be trapped within the zirconium while still maintaining a metallic structure. This also occurs with certain other materials, such as titanium and hafnium. However, titanium and hafnium alone do not have adequate neutronic properties for moderated core block applications. Indeed, hafnium is a neutron poison with a large neutron absorption cross section.

The beta phase of zirconium is a high temperature phase that can be stabilized by hydrogen. The beta phase for zirconium normally forms at around 860° C., but with hydrogen, the beta phase can form at as low as 550° C. Instead of 10 atomic percent hydrogen, closer to 40 atomic percent hydrogen can be obtained in the beta phase even at high temperatures (e.g., approaching or exceeding 800° C.). In other words, the beta phase of zirconium has considerably higher hydrogen solubility than the alpha phase. At room temperature, the hydrogen is essentially trapped in the zirconium matrix. The monolith could be quenched in the beta phase, which causes the hydrogen to stay in a metastable beta phase structure where the hydrogen is locked (i.e., frozen) into the higher temperature structure at room temperature.

FIG. 1 is a top cutaway view illustrating a nuclear reactor core 100, according to an embodiment of the present invention. Nuclear reactor core 100 includes fuel rods 110, moderator rods 120, and heat pipes 130. Heat pipes 130 are interspersed evenly throughout nuclear reactor core 100 in this embodiment. Moderator rods 120 are arranged in hexagons between hexagons of alternating fuel rods 110 and heat pipes 130. However, any suitable reactor shape, number of fuel rods 110, moderator rods 120, and/or heat pipes 130 may be used without deviating from the scope of the invention. In some embodiments, moderator rods 120 may not be included.

A hydrogen infused monolith 140 provides structure for fuel rods 110, moderator rods 120, and heat pipes 130 and holds them in place. While hydrogen infused monolith 140 has a hexagonal shape in FIG. 1, other monolith shapes may be used, including, by not limited to, spheres, cylinders, pentagons, irregular shapes, etc. without deviating from the scope of the invention. In addition to hydrogen, hydrogen infused monolith 140 may include other element(s) and/or alloy(s) with high neutron transparency including, but not limited to, zirconium, aluminum, cerium, scandium, beryllium alloys, magnesium, graphite, beryllium oxide, zirconium hydride, yttrium dihydride, other alloys, a combination thereof, etc. Hydrogen infused monolith 140 provides partial moderation itself, and full moderation in combination with moderator rods 130 (if used).

In some embodiments, hydrogen infused monolith 140 includes 10 atomic percent hydrogen or less absorbed in the other material(s) of hydrogen infused monolith 140. In certain supersaturated embodiments, such as supersaturated zirconium monoliths, the atomic percent of hydrogen may approach, meet, or exceed 40%. In some embodiments, the hydrogen and other structural element(s) exist in two phases at room temperature, and hydrides are a small volume fraction at room temperature. However, as reactor temperatures are raised to operating temperatures, the hydrogen goes into solution. In embodiments using zirconium, the hydrogen stabilizes the beta phase, so a relatively large amount of hydrogen can be trapped within the zirconium while still maintaining a metallic structure. In such embodiments, hydrogen infused monolith 140 includes 40 atomic percent hydrogen or more.

Figure 2A:
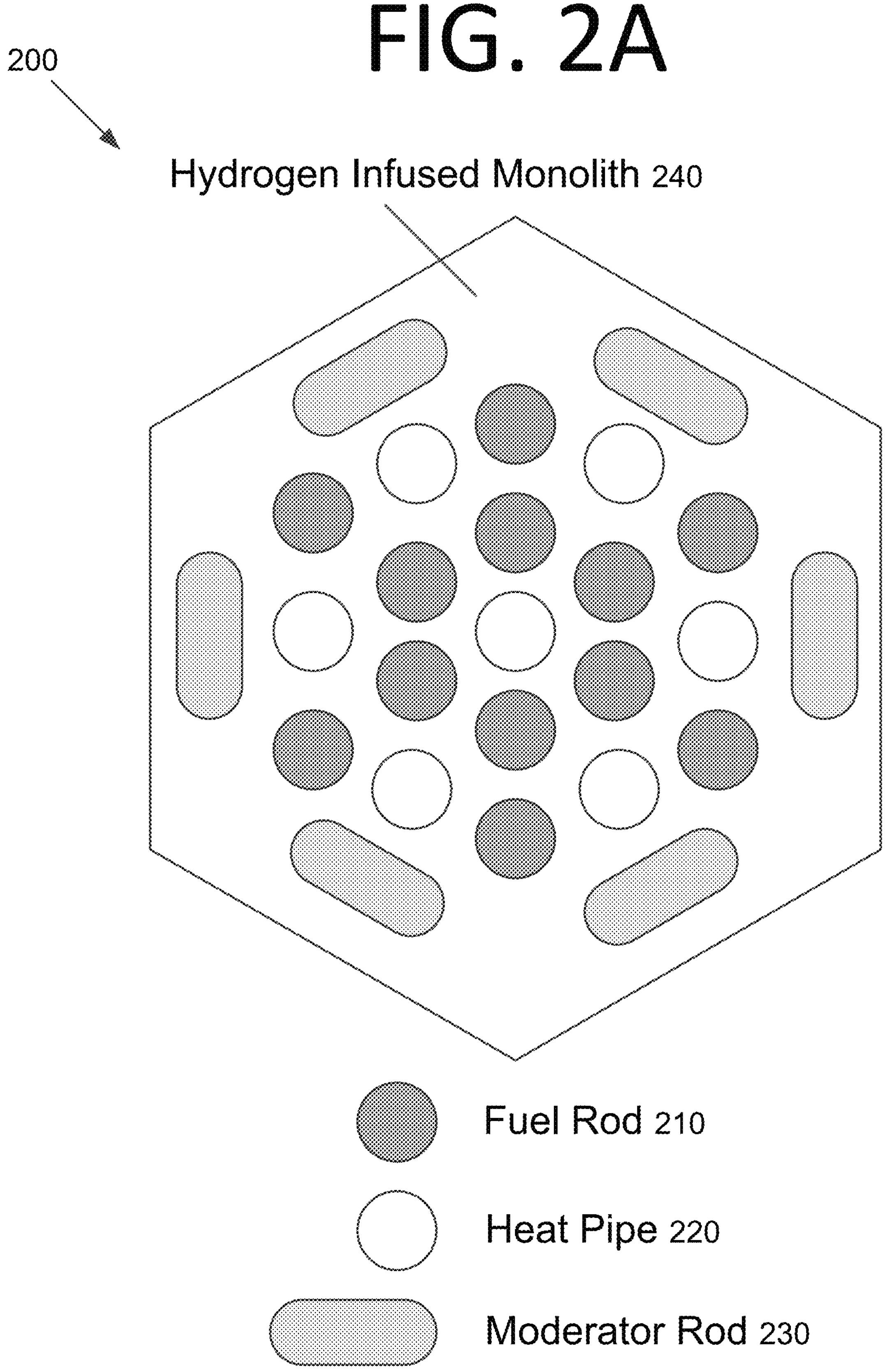
FIGS. 2A and 2B are top cutaway views illustrating another nuclear reactor core with and without moderator rods, respectively, according to an embodiment of the present invention.
Figure 2B:
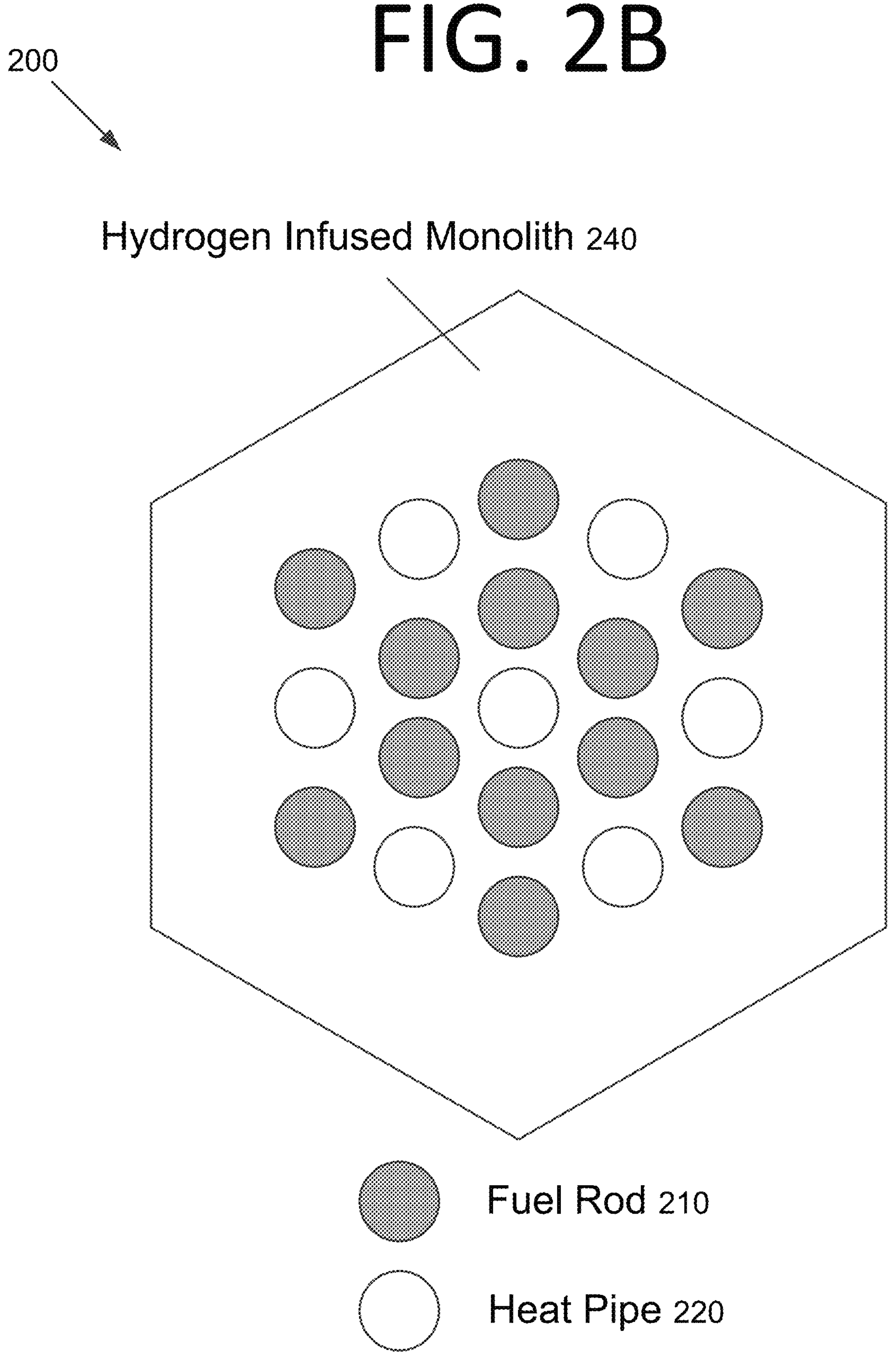

FIGS. 2A and 2B are top cutaway views illustrating a nuclear reactor core 200 with and without moderator rods 230, respectively, according to an embodiment of the present invention. In FIG. 2, nuclear reactor core 200 includes a hexagon-shaped "ring" of six fuel rods 210 surrounding a center heat pipe 220. Outside of the ring of fuel rods 210, six alternating fuel rods 210 and heat pipes 220 are positioned and evenly spaced.

Outside of each "face" of the hexagon-shaped ring of alternating fuel rods 210 and heat pipes 220, a respective pill-shaped moderator rod 230 is located in FIG. 2A. However, moderator rods may not always be included. See FIG. 2B. Moderator rods 230 may include hydrided material, such as yttrium dihydride (e.g., $YH_{1.8}$), zirconium hydride, etc. Fuel rods 210, heat pipes 220, and moderator rods 230 are located within a hydrogen infused monolith 240, which provides structure for fuel rods 210, heat pipes 220, and moderator rods 230 (if present) and holds them in place. In addition to hydrogen, hydrogen infused monolith 240 may include other element(s) and/or alloy(s) with high neutron transparency including, but not limited to, zirconium, aluminum, cerium, scandium, beryllium alloys, magnesium, graphite, beryllium oxide, zirconium hydride, yttrium dihydride, other alloys, a combination thereof, etc. Hydrogen infused monolith 240 provides partial moderation itself, and full moderation in combination with moderator rods 230 (if used).

In some embodiments, hydrogen infused monolith 240 includes 10 atomic percent hydrogen or less absorbed in the other material(s) of hydrogen infused monolith 240. In certain supersaturated embodiments, such as supersaturated zirconium monoliths, the atomic percent of hydrogen may approach, meet, or exceed 40%.

Figure 3:
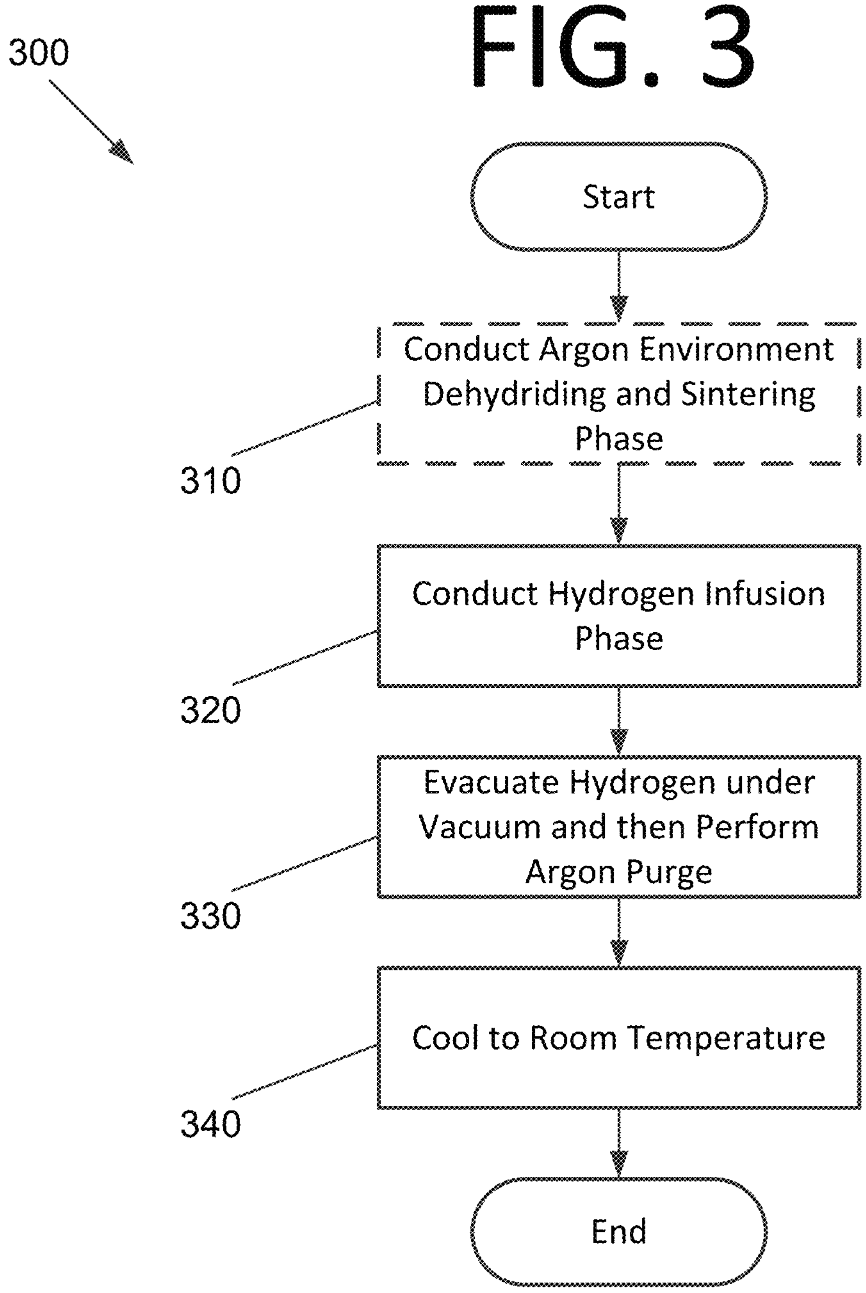
FIG. 3 is a flowchart illustrating a process for producing hydrogen infused monoliths, according to an embodiment of the present invention.

FIG. 3 is a flowchart illustrating a process 300 for producing hydrogen infused monoliths, according to an embodiment of the present invention. The process may begin with conducting an argon environment dehydriding and sintering phase for a monolith or one or more parts of a monolith at 310 if one or more metal hydrides are used for the monolith material. Once dehydrided, the metal hydride(s) revert to a stoichiometry that is below hydrogen saturation limit(s) of the metal hydride(s), which is no longer a metal hydride, but rather, a metal with hydrogen in solution. However, in some embodiments, non-hydrided materials may be used, such as metal powders, and the dehydriding step may be skipped.

Metal hydrides may be easier to work with than other forms of zirconium, for example. Metal hydrides tend to have a brittle nature that lends itself to powder processing. Metal hydrides are also slightly more resistant to oxidation than metal powders. While argon is used in this embodiment, it should be noted that any noble gas or combination of noble gases may be used for any suitable step of process 300 without deviating from the scope of the invention.

During this phase, the monolith or portion(s) of the monolith are heated to a desired maximum temperature (e.g., a first temperature), maintained at the maximum temperature for a period of time, and then lowered to a second temperature for hydrogen infusion. For instance, for α-Zr, the second temperature may be about 1100-1200° C. For (3-Zr, the second temperature may be approximately 800° C.). It should be noted that these temperatures are higher than for zirconium hydride, which would be formed at about 650-700° C. Zirconium at anywhere between 800°

C. and 1,200° C. would absorb hydrogen quickly. The maximum temperature for dehydriding may be approximately 800° C., 1,000° C., 1,100° C., 1,200° C., 1,600° C., or any other suitable temperature without deviating from the scope of the invention. The maximum temperature may depend on the monolith hydride material(s) (again, if step 310 is performed) that are to be infused with hydrogen. In certain embodiments, the monolith or piece(s) include one or more hydride metals and/or hydride metal alloys.

After reaching the second temperature, hydrogen infusion in an $H_2$/Ar environment is performed at 320. This involves bringing the amount of hydrogen to a desired level (e.g., ~6% $H_2$/Ar), maintaining this second temperature for a period of time until the desired atomic percent of hydrogen is reached (dependent on the mass of the material, the dimensions thereof, and the material permeability/density), and then lowering the furnace to a third temperature that is lower than the second $H_2$/Ar temperature. In some embodiments, the atomic percent of hydrogen may be the hydrogen saturation limit of the material or less. Exceeding the saturation limit may cause the formation of hydrides. In certain embodiments, such as those including zirconium, the atomic percent of hydrogen may be up to 40%, for example, and the material will be supersaturated with hydrogen at room temperature.

After reaching the third temperature, the $H_2$/Ar is evacuated under vacuum and then an argon purge is performed at 330. The monolith or piece(s) are left in this environment for a period of time so as to prevent or reduce formation of undesirable materials (e.g., ε-$ZrH_2$ for embodiments that include zirconium, $YH_3$ in embodiments that include yttrium, for example), and the furnace is then cooled to room temperature at 340. In certain embodiments, cooling to room temperature may be accomplished via a quench, which locks the monolith or piece(s) in the beta phase and causes the hydrogen to stay in a metastable structure, where the hydrogen is locked (i.e., frozen) into the higher temperature structure and in a supersaturation condition at room temperature. After this process, the hydrogen infused monolith or monolith piece(s) are ready to be incorporated in a nuclear reactor.

Some embodiments of process 300 accomplish hydrogen infusion in step 320 by causing hydrogen to be absorbed into the moderator material while actively arresting/avoiding hydriding. This may be accomplished by using temperatures where hydriding is unlikely to occur, based on the material(s) that are used. They hydrogen may be locked into the beta phase in some embodiments. When heated to operating temperature, both the beta phase structure of the monolith material and high hydrogen content are maintained. A goal of some embodiments is to reduce the alpha phase transition at room temperature as much as possible. Quenching helps to reduce the amount of the material that undergoes beta-to-alpha phase transition.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

In an embodiment, a nuclear reactor core monolith includes a hydrogen infused material. In certain embodiments, the hydrogen infused material comprises a hydrogen infused metallic material. In some embodiments, the hydrogen infused material has an atomic percent of hydrogen that is at or below a saturation limit of hydrogen for the material. In some embodiments, the atomic percent of hydrogen is also above half of the saturation limit of hydrogen for the material. In certain embodiments, the hydrogen infused material is supersaturated with hydrogen and locked at least partially in a beta phase at room temperature (e.g., 68-72° F.). In some embodiments, the nuclear reactor core monolith also includes a plurality of moderators positioned within the monolith.

In some embodiments, the hydrogen infused material includes zirconium or a zirconium-based alloy. In some embodiments, the hydrogen infused material has a neutron capture cross-section of 1.5 barns or less. In certain embodiments, the hydrogen infused material has a neutron capture cross-section of 0.25 barns or less. In certain embodiments, the hydrogen infused material includes zirconium, aluminum, cerium, scandium, a beryllium alloy, magnesium, graphite, beryllium oxide, zirconium hydride, yttrium dihydride, or a combination thereof.

In some embodiments, the monolith includes a plurality of separately manufactured and separately hydrogen infused pieces that are joined to form the monolith. In certain embodiments, the monolith has a hexagonal shape. In some embodiments, the monolith has a round, elliptical, square, or rectangular shape.

In some embodiments, an atomic percent of hydrogen in the hydrogen infused material is 5 to 10 atomic percent. In certain embodiments, the hydrogen infused material is at least partially locked in a beta phase of the material, the hydrogen is supersaturated in the material at room temperature with respect to an alpha phase, and an atomic percent of hydrogen in the hydrogen infused material is 20 to 40 atomic percent. In some embodiments, at least half of the hydrogen infused material is locked in the beta phase.

In another embodiment, a nuclear reactor core monolith includes a hydrogen infused material. In some embodiments, the hydrogen infused material has an atomic percent of hydrogen that is at or below a saturation limit of hydrogen for the material, but above half of the saturation limit of hydrogen for the material. In certain embodiments, the hydrogen infused material is supersaturated with hydrogen and locked at least partially in a beta phase at room temperature (e.g., 68-72° F.).

In some embodiments, the hydrogen infused material includes zirconium or a zirconium-based alloy. In some embodiments, the hydrogen infused material has a neutron capture cross-section of 1.5 barns or less. In certain embodiments, the hydrogen infused material has a neutron capture cross-section of 0.25 barns or less. In certain embodiments, the hydrogen infused material includes zirconium, aluminum, cerium, scandium, a beryllium alloy, magnesium, graphite, beryllium oxide, zirconium hydride, yttrium dihydride, or a combination thereof.

In some embodiments, the nuclear reactor core monolith includes a plurality of separately manufactured and separately hydrogen infused pieces that are joined to form the nuclear reactor core monolith. In certain embodiments, the nuclear reactor core monolith has a hexagonal shape. In some embodiments, the nuclear reactor core monolith has a round, elliptical, square, or rectangular shape.

In some embodiments, an atomic percent of hydrogen in the hydrogen infused material is 5 to 10 atomic percent. In certain embodiments, the hydrogen infused material is at least partially locked in a beta phase of the material, the hydrogen is supersaturated in the material at room temperature, and an atomic percent of hydrogen in the hydrogen infused material is 20 to 40 atomic percent. In some embodiments, at least half of the hydrogen infused material is locked in the beta phase.

In yet another embodiment, a method for producing hydrogen infused monoliths optionally includes conducting a noble gas environment dehydriding and sintering phase for a monolith or one or more parts of the monolith by heating the monolith or the one or more parts of the monolith to a first temperature. The monolith or the one or more parts of the monolith include a metal hydride. This results in the at least one metal hydride reverting to a stoichiometry that is below a hydrogen saturation limit of the metal hydride, which is no longer a metal hydride, but rather, a metal with hydrogen in solution. However, in some embodiments, non-hydrided materials may be used, such as metal powders. In certain embodiments, the noble gas environment dehydriding and sintering phase is not performed.

The first temperature is maintained until the stoichiometry is achieved and then the temperature is lowered to a second temperature and hydrogen is introduced for hydrogen infusion. This step includes bringing an amount of gaseous hydrogen to a desired level and maintaining the second temperature for a first period of time until a target atomic percent of hydrogen is reached in the monolith or the one or more parts of the monolith. After the target atomic percent of hydrogen is reached, the temperature is lowered to a third temperature that is lower than the second temperature, the hydrogen gas and the noble gas are evacuated, a noble gas purge is performed, and the monolith or the one or more parts of the monolith are left in this environment for a second period of time. The monolith or the one or more parts of the monolith are then cooled to room temperature.

In some embodiments, the atomic percent of hydrogen is less than or equal to a hydrogen saturation limit of the metal hydride, but greater than half of the hydrogen saturation limit. In certain embodiments, the atomic percent of hydrogen may be up to 40%, for example, and the material is supersaturated with hydrogen at room temperature. In some embodiments, the metal hydride is zirconium dihydride.

In still another embodiment, a method for producing hydrogen infused monoliths includes maintaining a monolith or one or more parts of the monolith in a gaseous hydrogen environment at a first temperature until a stoichiometry is achieved where a metal hydride in the monolith substantially converts to a metal with hydrogen in solution. The method also includes lowering the temperature to a second temperature, bringing an amount of the gaseous hydrogen to a desired level, and maintaining the second temperature for a first period of time until a target atomic percent of hydrogen is reached in the monolith or the one or more parts of the monolith.

The invention claimed is:

1. A nuclear reactor core comprising:
- a nuclear reactor core monolith,
- wherein the nuclear reactor core monolith comprises a hydrogen infused metallic material, and
- wherein a majority of the hydrogen present in the hydrogen infused metallic material is not present as a hydride.

2. The nuclear reactor core of claim 1, wherein the hydrogen infused metallic material of the nuclear reactor core monolith has an atomic percent of hydrogen that is at or below a solubility limit of hydrogen for the material.

3. The nuclear reactor core of claim 1, wherein, at 68-72° F., at least a portion of the hydrogen infused metallic material comprises a beta phase structure of the metallic material and the hydrogen infused metallic material is supersaturated with hydrogen.

4. The nuclear reactor core of claim 1, further comprising:
- a plurality of distinct moderator rods positioned within the nuclear reactor core monolith, the plurality of distinct moderator rods configured to thermalize neutrons.

5. The nuclear reactor core of claim 1, wherein the hydrogen infused metallic material of the nuclear reactor core monolith comprises zirconium or a zirconium-based alloy.

6. The nuclear reactor core of claim 1, comprising:
- a plurality of hydrogen infused pieces of metallic material, wherein the plurality of hydrogen infused pieces are joined to form the nuclear reactor core monolith.

7. The nuclear reactor core of claim 1, wherein an atomic percent of hydrogen in the hydrogen infused metallic material of the nuclear reactor core monolith is 5 to 10 atomic percent in an alpha phase of the metallic material.

8. The nuclear reactor core of claim 1, wherein the nuclear reactor core monolith is produced by a process comprising:

quenching the hydrogen infused metallic material to at least partially freeze and/or lock the material in a beta phase structure of the metallic material, wherein the hydrogen is supersaturated in the hydrogen infused metallic material at room temperature and an atomic percent of hydrogen in the hydrogen infused metallic material is 20 to 40 atomic percent.

9. The nuclear reactor core of claim 8, wherein at least half of the hydrogen infused metallic material is frozen and/or locked in the beta phase structure.

10. A microreactor comprising the nuclear reactor core of claim 1, wherein the microreactor produces up to 20 megawatts of thermal energy.

* * * * *